Aug. 22, 1967  G. S. ROBERTS  3,336,943
MULTIPLE PIPELINE
Filed Nov. 23, 1964  2 Sheets-Sheet 1
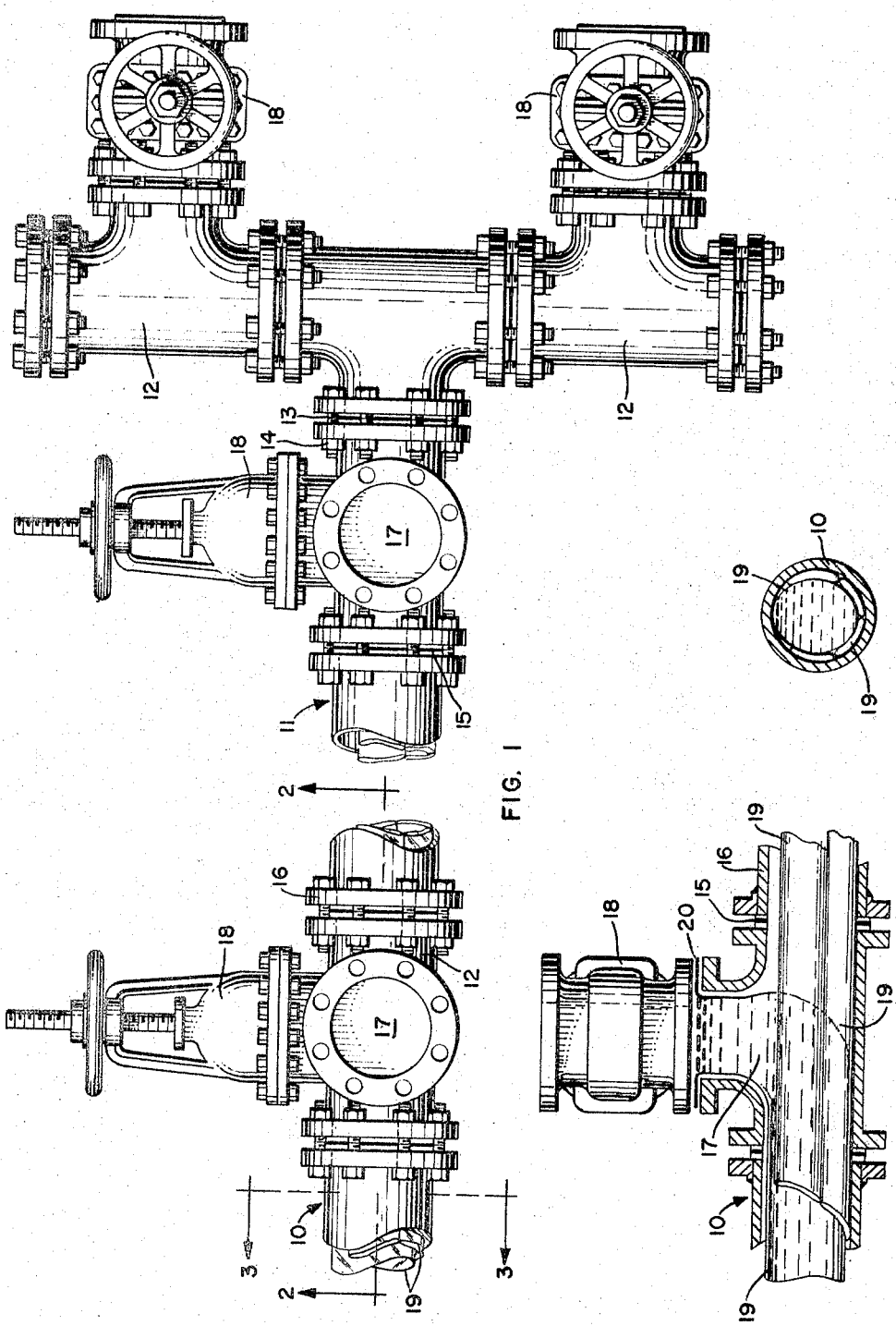

Aug. 22, 1967  G. S. ROBERTS  3,336,943
MULTIPLE PIPELINE

Filed Nov. 23, 1964  2 Sheets-Sheet 2

United States Patent Office 3,336,943
Patented Aug. 22, 1967

3,336,943
MULTIPLE PIPELINE
George S. Roberts, Baton Rouge, La., assignor to Ethyl Corporation, New York, N.Y., a corporation of Virginia
Filed Nov. 23, 1964, Ser. No. 413,203
4 Claims. (Cl. 137—594)

ABSTRACT OF THE DISCLOSURE

A pipeline having a pressure resistant rigid conduit containing a plurality of thin wall, flexible, collapsible hoses. Each hose is substantially the same size as the conduit and is attached at either end to a pipeline manifold. When any one of the hoses is filled with a fluid it compresses and collapses the unused hoses against the interior of the conduit. In one embodiment utilizing a plurality of coaxially arranged hoses, fluid pressure forces the unused outer hoses against the conduit and collapses the unused inner hoses within the hose in use. In another embodiment a fluid filled sock is provided at the end of a manifold to support the fluid filled flexible hose in the area where the conduit does not provide support.

---

This invention relates in general to a pipeline, particularly to a pipeline containing a plurality of thin-wall, collapsible hoses.

It is conventional to use a large number of rigid, permanent pipelines to connect the storage tanks in a tank farm to a loading dock, such as a railway car loading terminal or a ship or barge loading terminal. This is particularly true when a number of different liquid products are moved from tank storage to the loading terminal. Cross-contamination created by transporting different liquids through a single pipeline prevents the use of a single pipeline for transporting high purity products such as organic solvents and the like. In addition to the problem of contamination, the corrosive nature of certain chemical products often requires a separate pipeline of a corrosion resistant material for the transporting of these liquids. Another problem encountered in situations wherein a multiplicity of separate pipelines are required is that of degradation of the liquid products that are left static in the pipeline between movements of the product from the storage tank to the loading terminal. Long resident times between product movements can cause the product contained in the pipeline to go off-specification.

Therefore, it is an objcet of this invention to provide a pipeline that may be used for transporting a plurality of dissimilar products without any danger of cross-contamination.

It is another object of this invention to provide a multi-purpose pipeline of low cost as compared to the conventional steel pipelines.

It is still another object of this invention to provide a pipeline that is economical yet can be used to transport corrosive liquid products.

It is a still further object of this invention to provide a pipeline capable of carrying a number of different products which pipeline can be readily reconditioned at low cost.

The foregoing, and other aims, objects, and advantages of the invention as may appear hereinafter, are realized in a pipeline for the transport of fluid substances which includes an elongated, rigid, pressure resistant conduit having a plurality of individual openings on each end. A plurality of thin-wall, flexible, collapsible hoses are contained within the conduit and extend from one end of the conduit to the other end. Each one of the hoses is connected at its respective ends to an individual opening provided at each end of the conduit. Each one of the hoses is so constructed and arranged that it will substantially fill the interior volume of the conduit between the respective end openings when the single hose is filled with fluid, thereby compressing and collapsing the unused hoses against the interior of the conduit.

In the drawings:

FIGURE 1 is a plan view of one end of a multiple pipeline constructed in accordance with the present invention;

FIGURE 2 is a sectional view along line 2—2 of FIGURE 1;

FIGURE 3 is a cross-sectional view taken along line 3—3 of FIGURE 1;

Figure 4:
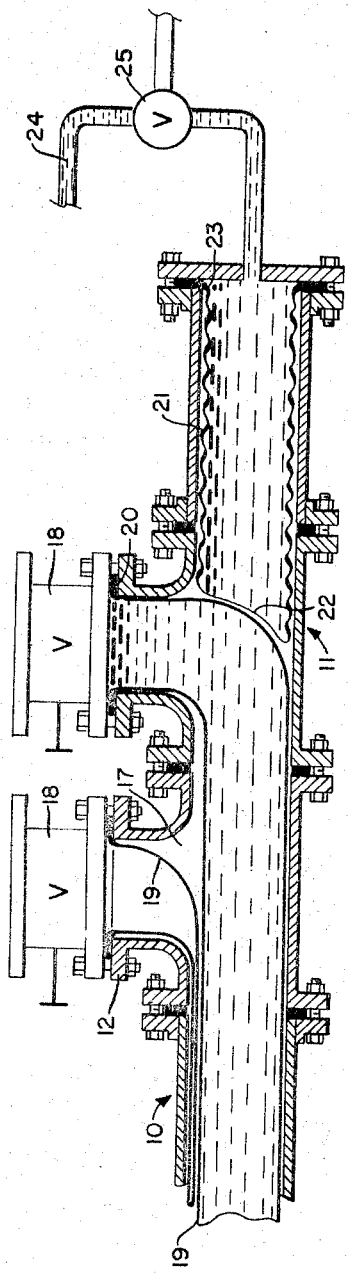
FIGURE 4 is a sectional view of another embodiment of the invention.

Referring to the drawings, particularly to FIGURE 1, there is shown one end of the pipeline, designated generally by the numeral 10. It is understood that the pipeline may be constructed of any material having sufficient rigidity and strength to withstand the pressures encountered in pumping liquid products through the pipeline. In normal operation, and for purposes of the present invention, the pipeline may be constructed of mild steel. In the embodiment of the invention depicted in FIGURE 1 a manifold, designated generally by the numeral 11, is attached to the end of the pipeline. The manifold 11 includes a plurality of interconnected flange T-sections of pipe 12. As shown, the flanged T-sections are connected by bolts 13 and nuts 14. A gasket 15 is provided between abutting flanges 16 in order to provide a seal between the interconnected T-sections. In the manifold 11, as shown in FIGURE 1, a number of the T-sections 12 have an inlet-outlet port 17 sealed by a suitable valve 18. It is understood that each of the valves 18 is in turn connected to a conventional single pipeline that leads to either a product storage tank or to a loading terminal line, depending upon which service that particular end of the pipeline is being used for.

Referring now to FIGURES 2 and 3, the interior of the pipeline 10 contains a plurality of thin-wall, collapsible hoses 19. Each of the hoses 19 has a diameter substantially equal to the inside diameter of the pipeline 10. Each one of the hoses 19 is continuous and extends from an inlet-outlet port 17 of one of the T-sections 12 to a like T-section at the other end of the pipeline. As seen more clearly in FIGURE 2, each end of the flexible hose 19 terminates in an integrally formed gasket 20 thereby providing a liquid-proof seal to prevent contact between the interior of the steel pipeline and the liquid product being transferred. In transporting a liquid product through the pipeline of the present invention, it is contemplated that only a single one of the hoses 19 will be in use at any given time. As seen in FIGURE 3 the unused hoses 19 will be collapsed and pressed against the interior walls of the steel pipeline 10.

One of the advantageous features of the pipeline of the present invention is that it permits complete displacement of any given product from the pipeline at the end of each service period. This may be conveniently accomplished by reserving one of the flexible hoses 19 for use as a water purge line. By closing the product valve at the tank farm manifold end of the pipeline and leaving the corresponding valve open on the loading terminal end of the line, one can displace the product in the flexible hose 19 by filling the water purge hose beginning at the tank farm end of the line.

The collapsible hoses 19 may be made from any suitable material that is chemically and physically resistant to the liquid product to be transported through that articular hose. In general the preferred material for making the hoses 19 is a suitable flexible, strong, solvent resistant thermoplastic material. One material particularly suited for use in the pipeline of the present invention is polyethylene. Polyethylene hoses of suitable thickness may be used for transporting basic and acidic materials without any danger of contamination by contact with the steel pipeline. However, polyethylene is in general not suitable for use in pipelines wherein hydrocarbon solvents such as naphtha, gasolines, oils and other petroleum products are transported. Another preferred material for use in making the flexible hoses is flexible polyvinyl chloride. Hoses prepared from polyvinyl chloride film are satisfactory for use in transportation of alcohols, acids, alkalies, petroleum such as gasoline, naphtha, lube oils, and other similar chemical products. The polyethylene hoses particularly adapted for use in the present invention may be made without using any plasticizers or other additives in the hose material. However, to provide the necessary flexibility hoses of polyvinyl chloride must be made from PVC formulated with suitable plasticizers, stabilizers and lubricants. A particularly suited formulation for flexible PVC is as follows: 100 parts of a medium molecular weight polyvinyl chloride such as Diamond 450 or Geon 103 EP, 40–80 parts of dioctyl phthalate plasticizer, 8 parts of tribasic lead sulfate as a stabilizer, ½ part paraffin wax lubricant, and 10–20 parts "Atomite" (a form of calcium carbonate) as a filler.

Polyethylene or plasticized polyvinyl chloride may be extruded on a conventional tube forming extruder to prepare the hoses suitable for lining the pipeline of the present invention. While the present invention is not limited to pipelines of any specific inside diameter, the sizes adapted for general use in transporting liquid products between tank farms and loading terminals will in general range in size from about 2 inches to about 24 inches ID. Suitable flexible hoses for pipelines of the foregoing sizes should have a wall thickness within the range from about 0.040 inch to about 0.080 inch. The thickness required for the wall of the hose will be determined to some extent by the particular material from which the hose is constructed.

While hoses made from polyethylene and flexible polyvinyl chloride will find most general application, other materials may be used to fabricate the hoses. A particularly suitable material for a flexible hose for transporting organic solvents is plasticized polyvinyl alcohol. PVA hose is particularly resistant to organic solvents and to a wide variety of gases, however its use is restricted to substantially anhydrous systems since the plastic has a low tolerance for water. Other suitable materials are specialty rubbers such as neoprene. In addition to hoses made from unsupported thermoplastic tubing, the hoses may be made from impregnated fabrics such as cotton cloth, fiber glass cloth or other suitable woven tubing that has been given a coating of a plastic material. The fabric reinforced hoses are in general more useful in transporting viscous or semi-viscous fluids wherein relatively high pressures are required to move the fluids. They are less desirable due to their greater bulk and lower compressibility as compared to a hose made from a non-supported tube of polyethylene or flexible polyvinyl chloride. Impregnated or internally coated fabric hoses may be conveniently prepared using a PVC plastisol. A suitable formulation for a PVC plastisol is as follows: 100 parts of a polyvinyl chloride polymer such as Geon 121 or Diamond 71A, 40–80 parts of dioctyl phthalate plasticizer, and 4 parts of a barium-calcium laurate stabilizer such as Advance Chemical Company's "KCB." The plastisol is normally stirred in a suitable mixture prior to coating the substrate. The substrate may be coated by any of the convenient methods such as dip coating, doctor blade, spread coating, or reverse roller coating. After coating the fabric is normally heated for about 10 minutes at a temperature of 350° C. to solidify the plastisol into an impervious film on the surface of the substrate.

While the manifold depicted in the drawings is made up of separate bolted T-sections of pipe, any other suitable construction may be used to make up the manifold at each end of the pipeline. The T-sections may be separately fabricated and welded together to form a manifold and then attached by welding to each end of the pipeline. The manifold at each end of the pipeline may also be constructed by welding suitable elbows to openings provided along one end of the pipeline. Regardless of the construction of the manifold, the wall area adjacent each of the inlet-outlet ports 17 should have a fairly long radius turn. This is desirable in order to eliminate any sharp corners where the flexible hose makes a 90 degree turn. In general sharp corners and rough surfaces are to be avoided in constructing the pipeline in order to minimize points of abrasion which may puncture or weaken the flexible hoses. In the construction of a welded pipeline, it is desirable to use back-up rings under the weld connecting each joint of pipe in order that the interior surface of the pipeline at each of the weld joints will present a smooth surface to the plastic hoses. Another alternate to the use of back-up rings is to ream the interior wall of the pipeline smooth after all welds have been made.

In most cases the thermoplastic hoses will be of sufficient strength to tolerate moderate pressures encountered in pumping fluids through the pipeline, however it may be necessary to provide reinforcement over a length of the hose adjacent each end. Double or triple thicknesses of the plastic may be thermally welded into a unitary hose to provide reinforcement at the ends of each hose. Another method of preventing rupture of the hoses adjacent the ends where the hose makes its 90 degree turn is to fill the portion of the manifold behind that particular hose in use with a pressurized fluid. The fluid in the manifold end is maintained at a pressure equal to the fluid being transported through the hose to provide back-up for the area of the hose that is unsupported by the pipe T-section.

While the counter-balacing fluid may be in direct contact with the interior wall of the manifold, it is preferred to confine the fluid in an elongated hose sock 21 as shown in FIGURE 4. The sock 21 has its closed end 22 adjacent and in contact with the unsupported portion of the hose 19 which is under pressure. The sock terminates at its open end 23 in an integrally formed gasket in the same manner as do the hoses 19. The sock 21 has a length that permits it to elongate to position the closed end 22 of the sock against the unsupported wall portion of the hose that is the farthest away from the blinded end of the manifold. A convenient source of counter-balancing fluid for the sock 21 is from the source of fluid being pumped through the hose 19 that is in service.

As may be seen in FIGURE 4, the pressured counter-balance fluid may be tapped from the downstream side of valve 18 and carried by line 24 to the interior of sock 21. A dump valve 25 may be provided in the line 24 to discharge excess counter-balance fluid when changing service from a hose using an inlet-outlet port 17 that is downstream to a hose that is connected to an inlet-outlet port that is closer to the end of the manifold.

An alternative method of providing counter-balancing fluid at the proper pressure is to use an independent source of fluid and pressurize it with a separate pump. The fluid may be water or ethylene glycol in a container connected to the open end of the sock by a line having a pressurizing pump equipped with a by-pass valve. The by-pass valve is controlled by a suitable pneumatic mechanism that receives its primary signal from electrical strain gages that are contained in an outer sleeve that encases the end of each hose in the manifold. The stretching of the strain gages will open or close the by-pass valve to either increase or decrease the counter-balance pressure in the sock as the pressure of the fluid inside the hose in use changes.

Figure 5:
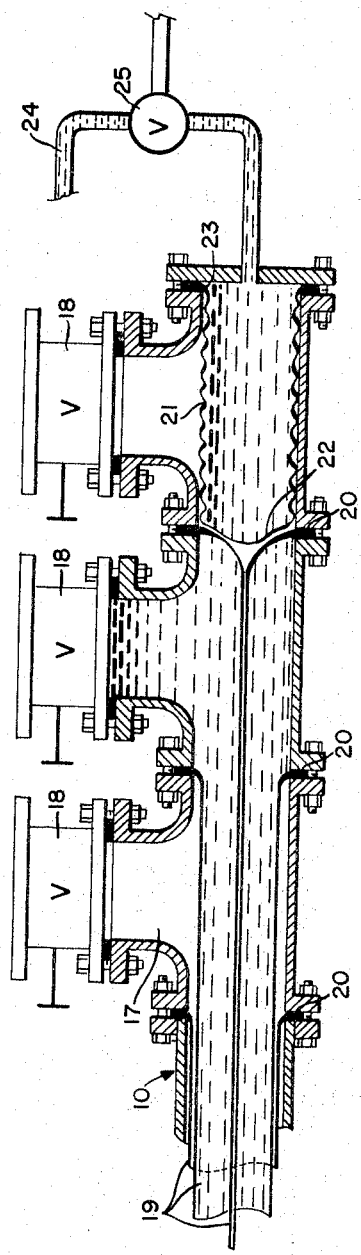
FIGURE 5 is a view like FIGURE 4 of still another embodiment of the invention.

Referring now to FIGURE 5, another embodiment of the multiple pipeline 10 of the present invention has all of the thermoplastic hoses 19 arranged concentrically within the steel outer conduit. The hoses outside of the one hose in use are pressed against the wall of the steel conduit while the hoses inside are collapsed by the surrounding fluid. In this form the pipeline hoses 19 have the integrally formed gasket 20 on the ends clamped between the T-section rather than extending to an inlet-outlet port 17. A hose sock 21 having a closed end 22 and an open end 23 is positioned in the end of the pipeline to hold the counter-balancing fluid in a manner similar to that described for the embodiment of the pipeline shown in FIGURES 1–4. The closed sock end 22 will counter-balance the end of the hose 19 which is in use to prevent a blowout from occurring in the area where the hose is not supported by the side walls of the steel pipe.

In constructing the pipeline of the present invention the thermoplastic hoses may be conveniently inserted in a prepared steel pipeline prior to attaching the manifolds to each end. One convenient method of placing the hoses in position is to attach one end of the desired number of hoses to a pig and to blow the pig through the pipeline to pull the hoses through by means of air or water pressure. This technique can also be used to replace a torn or unserviceable hose after the pipeline has been constructed. Another technique that is usable for replacing one of the hoses is to tie the new hose to the end of the old one and then use the old hose as a means to pull the new hose into position.

In normal operation the interior of the steel pipeline will be free from the presence of any liquid, however upon the rupture of any one of the hoses liquid pressure will be applied directly to the walls of the steel pipeline. A convenient indication of internal rupture of one of the hoses may be had by installing a pressure gage or a pressure actuated signal device (not shown) on a tap made to the interior of the steel pipeline. An early indication of a failure of one of the hoses is desirable in order that the hose may be quickly replaced and the steel pipeline washed free of corrosive materials.

The foregoing disclosure and description of the invention is illustrative and explanatory thereof and, in light thereof, other modifications will be apparent to those skilled in the art. Therefore the present invention is to be limited only by the scope of the appended claims.

What is claimed is:

1. In a pipeline for transport of fluid substances, the combination comprising:
   (a) an elongated, rigid, pressure resistant conduit;
   (b) a manifold including a plurality of interconnected pipe T-sections attached to each end of said conduit;
   (c) one port of each of said pipe T-sections serving as an inlet-outlet port for said conduit;
   (d) a plurality of thin-wall, flexible, collapsible hoses extending through said conduit, each one of said hoses connected at its respective ends to an inlet-outlet port of one of said pipe T-sections at each end of said conduit;
   (e) each of said hoses being so constructed and arranged that a single hose will substantially fill the volume of said conduit between the respective connected pipe T-sections when said single hose is filled with fluid and thereby compress and collapse the other unused hoses against the interior of said conduit;
   (f) a thin-wall, flexible, longitudinally extendable hose sock received in the terminal portion of each of said manifolds, said sock having its open end connected to said manifold adjacent to the end of each manifold and its closed end adapted to be extended into supporting contact with the unsupported wall portion of said fluid filled single hose in use; and
   (g) a source of pressurized fluid supplied to the interior of said hose sock at substantially the same pressure as the fluid within said single hose in use.

2. In a pipeline for transport of fluid substances, the combination comprising:
   (a) an elongated, rigid, pressure resistant conduit;
   (b) a manifold including a plurality of interconnected flanged pipe T-sections attached to each end of said conduit;
   (c) one port of each of said flanged pipe T-sections serving as an inlet-outlet port for said conduit; and
   (d) a plurality of thin-wall, flexible, collapsible hoses coaxially arranged one within the other extending through said conduit, said hoses having substantially the same diameter as said conduit and having their respective ends sealingly engaged between separate interconnected flanged portions of the pipe T-section manifolds in a manner to provide a plurality of separate fluid movement channels within said conduit.

3. In a pipeline for transport of fluid substances, the combination comprising:
   (a) an elongated, rigid, pressure resistant conduit;
   (b) a manifold including a plurality of interconnected flanged pipe T-sections attached to each end of said conduit;
   (c) one port of each of said flanged pipe T-sections serving as an inlet-outlet port for said conduit;
   (d) a plurality of thin-wall, flexible, collapsible hoses coaxially arranged one within the other extending through said conduit, said hoses having substantially the same diameter as said conduit and having their respective ends sealingly engaged between the flanged portions of the pipe T-section manifolds in a manner to provide a plurality of separate fluid movement channels within said conduit;
   (e) a thin-wall, flexible, longitudinally extendable hose sock received in the terminal portion of each of said manifolds, said sock having its open end connected to said manifold adjacent the end of each manifold and its closed end adapted to be extended into supporting contact with any one of said collapsible hoses adjacent its sealingly engaged end; and
   (f) a source of pressurized fluid supplied to the interior of said hose sock at substantially the same pressure as the fluid within said single hose in use.

4. The combination defined in claim 2 wherein each end of said hoses is provided with an integrally formed gasket.

References Cited
UNITED STATES PATENTS 2,181,002 11/1939 Warner _____ 138—114 X
3,171,426 3/1965 Lang _____ 137—262

ALAN COHAN, *Primary Examiner.*